United States Patent Office 2,906,669
Patented Sept. 29, 1959

2,906,669

PRODUCTION OF DEXTRAN

Edward J. Hehre, Pelham Manor, N.Y., Henry M. Tsuchiya, Peoria, Ill., Nison N. Hellman, Milwaukee, Wis., and Frederic R. Senti, Peoria, Ill., assignors to United States of America as represented by the Secretary of Agriculture No Drawing. Application October 30, 1956
Serial No. 619,362

2 Claims. (Cl. 195—31)

(Granted under Title 35, U.S. Code (1952), sec. 266)

A non-exclusive, irrevocable, royalty-free license in the invention herein described, throughout the world for all purposes of the United Statese Government, with the power to grant sublicenses for such purposes, is hereby granted to the Government of the United States of America.

This application is a continuation-in-part of our copending application, Serial Number 348,134, filed April 10, 1953, now abandoned.

This invention relates to the preparation of dextran by direct biologic synthesis, and to a novel dextran product. It relates particularly to the biologic synthesis of a dextran possessing unusual molecular weight characteristics, by the reaction of Streptococcus sp. NRRL B-1351.

It is known that carbohydrate gum, dextran, can be produced by the action of certain microorganisms on a sucrose containing medium. Heretofore the organisms used for commercial production of dextran have been various strains of *Leuconostoc mesenteroides*. The individual strains vary as to the specific character of the dextran produced, each producing gums of different physical properties and different chemical structure. These differences, however, appear to vary in degree, with very few, if any, exceptions occurring among the various "native" dextrans produced by *L. mesenteroides* or by other known dextran producers.

The principal dextran product, and that customarily isolated directly from fermentation media, consistently has molecular weights greater than one million. We have recognized as accompanying the principal dextran product, though not generally isolated from the fermentation media, a second dextran component of average molecular weight consistently less than about 25,000. However, since dextran for use for pharmaceutical purposes, as blood volume expanders, and many other purposes, must be of an intermediate molecular weight, it has not been heretofore possible to produce them suitable for direct use.

Methods have been devised so that the proportion of low molecular weight dextran may be increased or decreased at the expense of high molecular weight dextran. Nevertheless, prior to our discovery, no significant amount of dextran of intermediate molecular weight has be known to occur as a direct fermentation product, and all attempts to vary the cultural conditions to produce such intermediate products directly from a simple sucrose containing medium have failed.

It has therefore been necessary to degrade the high molecular weight dextran by chemical, enzymic, or physical treatment in order to obtain dextran with weight average molecular weight of 25,000 to 200,000. High molecular weight dextran is conventionally hydrolyzed with acid, and the hydrolyzate carefully fractionated. Other degradative methods that have been studied are pyrolysis, enzymolysis or degradation by means of ultrasonic treatment.

We have discovered that a certain organism, biologically related to the known dextran producers, is capable of producing directly a dextran having a molecular weight within the range of 25,000 and 200,000. The cultural conditions required by the organism are essentially analogous to those of known dextran producers, and the reasons why our organism produces an intermediate-sized product are not known.

This organism, Streptococcus sp. var. DS strain 50 NRRL B-1351, belongs to the viridans group of streptococci. However, it differs from the currently recognized species of this group, *S. salivarius, S. mitis, S. bovis, S. thermophilus,* and *S. equinus*. The properties of the streptococcus of our present disclosure and of these viridans organisms are given in Table I. Physiological, serological and product comparisons of Streptococcus sp. group H of Hare, J. Path. and Bact., 41: 495 (1935); Streptococcus sp. var. DS Hehre and and Neill, J. Exptl. Med., 83: 147 (1946), and by Hehre, Bull. N.Y. Acad. Med., 24: 543 (1948), and *Streptococcus sanguis*, White of White and Niven, J. Bacteriol., 51: 717 (1946), are shown in Table Ia. The data shows that our organism is more closely related to *Streptococcus sanguis* than to Streptococcus sp. group H.

Native dextrans of high molecular weight, i.e., many millions, are known to precipitate readily in alcoholic solutions of 40 percent concentration. The lower the molecular weight of the main fraction, the higher the concentration of alcohol required to precipitate it. The methanol precipitation data on the dextran produced by Streptococcus sp. var. DS strain 50, Hehre, J. Biol. Chem., 222: 739 (1956), clearly indicate a unique product in that its molecular weight varies from a few thousand (18 percent not precipitated at 65 percent methanol) up to ±200,000 at the lowest concentration of methanol.

Another difference between Streptococcus sp. var. DS and *S. sanguis* should be noted. Although the former has been isolated from cases of bacterial endocarditis, it is also known to occur in normal human throats. The latter species has been found only in the blood stream of heart vegetation of endocarditis patients.

TABLE Ia

| Streptococcus sp., Group H of Hare | Streptococcus sp. DS— | Streptococcus sp. (4) | Streptococcus sanguis (42 strains) |
|---|---|---|---|
| Greening on blood agar | + | + | +. |
| Oxidation of hemoglobin | + | + | ?. |
| Hemolytic colonies [1] | + | — | —. |
| Growth at 10 degrees C | — | — | —. |
| Growth at 45 degrees C | + | + | ± {55%, +. 45%, —. |
| Growth on 40% bile blood agar | — | ? | +72%. |
| Growth in media plus 6.5% NaCl | — | — | —. |
| Arginine hydrolyzed | + | + | +. |
| Sodium hippurate hydrolyzed | — | ? | —. |
| Slime synthesis, 5% sucrose broth | + | + | +. |
| Dextran pptn. at final methanol concentration of: | | | |
| 40% | 85–100% | 10% | ? {tested on one |
| 45–50% | — | 27% | 100% {culture |
| 50–65% | 0 | 21% | 0 {only. |
| Dextran precipitated by antipneumococcal serums: | | | |
| Type 2 antiserum | +[2] | +[2] | ?. |
| Type 20 antiserum | +[3] | +[3] | ?. |
| Acid production from— | | | |
| Trehalose | ± | + | +. |
| Raffinose | + | — | —. |
| Inulin | — | + | +. |
| Esculin | ± | + | +. |

[1] On 5% horse blood agar, incubated 2 days under Anaerobic conditions.
[2] Group H—at dilutions from 10,000–40,000; Strept. 50 at 4,000–10,000.
[3] Group H—at dilutions from 4,000–10,000; Strept. 50 at 1,000–10,000.
[4] Physiological characteristics of 22 strains examined by Hehre and Niell; dextran pptn. data applies only to product from strain 50.

However, it would seem unwise to assign a species name to the Streptococcus of our present disclosure until such time as the relationships between these organisms have been resolved.

age molecular weight of the last 10 percent of the product was 18,600. The inherent viscosities of these two end

TABLE I

| | Strept. sp. var. DS-50 NRRL B-1351 | Strept. salivarius | Strept. mitis | Strept. bovis | Strept. thermophilus | Strept. equinus |
|---|---|---|---|---|---|---|
| 1. source | blood of patient with subacute endocarditis. | saliva, sputum in various pulmonary infections; apical abscesses of teeth; carious lesions of teeth and intestinal tract. | saliva, sputum in various pulmonary infections; pus from upper respiratory tract and sinuses; blood and various organs in subacute endocarditis. | saliva, feces and intestinal contents of cattle; milk of cows; sometimes in human feces. | milk and milk products. | human and bovine feces; urine and inflammatory exudates. |
| 2. blood agar | greening | no greening | greening | greening sometimes | no greening | no greening. |
| 3. dextran formation | + | usually − | | + sometimes | | |
| 4. levan formation | − | + | | | | |
| 5. starch hydrolysis | − | − | | | | usually −. |
| 6. arginine hydrolysis | + | − | | + | + | |
| 7. raffinose | − | acid | variable | acid | usually − | usually −. |
| 8. inulin | acid | acid | − | variable | − | usually −. |
| 9. arabinose | − | − | − | variable | usually − | −. |

According to the present invention Streptococcus sp. NRRL B-1351 also reported as Streptococcus var. DS, strain 50 is cultivated in an aqueous medium comprising up to 20 percent or more sucrose and a source of assimilable nitrogen. Depending upon the temperature, concentration of sucrose, and other factors, the fermentation time may vary however from as short as two days up to about two weeks. The temperature of the culture medium should be maintained at about 35 to 39° C. for best results, and the pH at the start of the fermentation should be adjusted, if necessary, to within the range of 6 to 8.

After completion of the fermentation the dextran may be recovered by differential alcohol precipitation. A convenient recovery method is (1) precipitating extraneous matter with 35 percent alcohol, (2) centrifuging to remove the precipitate, (3) precipitating the dextran in the supernatant with 65 percent alcohol (ethanol or methanol), (4) redissolving the washed dextran in water and (5) precipitating again with 65 percent alcohol. If it is desired to fractionate the product, this may generally be done by the incremental addition of alcohol over the range of 42 to 50 percent.

The following specific examples illustrate the invention.

*Example 1*

A culture medium (3 l.) was made up having the following composition.

Sucrose _____ 20 gm./100 ml.
Tryptose _____ 1.0 gm./100 ml.
Yeast extract _____ 0.5 gm./100 ml.
$K_2HPO_4$ _____ 0.75 gm./100 ml.

The medium was adjusted to pH 7.6, and following sterilization, was inoculated with Streptococcus sp. NRRL B-1351. The temperature was maintained at about 37° C. for a period of 72 hours, at which time the medium was centrifuged, neutralized with sodium hydroxide and clarified. The supernatant liquor was made up to 65 percent ethanol, and the precipitate collected centrifugally. The precipitated material was dissolved in water. An insoluble material was obtained by centrifugal separation in the amount of 4.75 grams. The dissolved dextran was precipitated again at 65 percent ethanol to yield 117 grams dry product. The weight average molecular weight of this product was 58,200 as determined by light scattering methods. Its inherent viscosity was 0.243.

The weight average molecular weight of the first 15.3 percent of the product, precipitated on the graduated addition of ethanol was 181,000, and the weight average fractions were 0.521 and 0.084, respectively. An 80 gram portion of this product was further fractionated with methanol at 25° C. in a 5 percent aqueous solution adjusted to pH 7. Three fractions, I, II, and III, were separated between the methanol concentration limits of 0 to 43 percent, 43 percent to 50 percent, and 50 percent to 65 percent with yields of 17 percent, 49 percent, and 21.5 percent of the original portion. The molecular weights of fractions I, II and III were 199,000, 54,300 and 11,200, respectively.

Fraction II was further fractionated with methanol to determine the distribution of molecular weights of its components. The fraction (12.8) percent of highest molecular weight as separated by methanol precipitation had a weight average molecular weight of 96,700. The fraction (15.0 percent) of lowest molecular weight had a weight average molecular weight of 21,500.

Interpretation of the formic acid produced and the periodate consumed in a sodium periodate oxidation of fractions I, II, and III indicate the following distribution of glucosidic linkages.

TABLE II

| Fraction | Linkage | | |
|---|---|---|---|
| | 1-6 | 1-4 | 1-3 |
| I | 78.9 | 7.2 | 13.9 |
| II | 83.9 | 7.0 | 9.2 |
| III | 79.6 | 5.4 | 15.0 |

*Example 2*

The following example illustrates the behavior of the organism in a culture medium containing a different source of assimilable nitrogen. The medium employed was as follows:

Sucrose _____ 200 gm./1000 ml.
Corn steep liquid solids _____ 10 gm./1000 ml.
$KH_2PO_4$ _____ 10 gm./1000 ml.

The medium was adjusted to pH 7.6, and following sterilization was then inoculated with the organism. One liter cultures in 2800 ml. Fernbach flasks were incubated at 37° C. under both still and shake conditions. Dextran determinations were made at the time intervals indicated in Table III. Dextran determinations were conducted by first undercutting with 40 percent ethanol to remove cells, high molecular weight materials and insolubles; then precipitating the dextran with 65 percent ethanol; redissolving the precipitate in water and determining the dextran content polarimetrically using $[\alpha]_D^{20}$ of +200°.

TABLE III

| Time, Hrs. | Dextran Yields, percent of theory | |
|---|---|---|
| | Still | Shaken |
| 24 | 11 | 3.4 |
| 48 | 23 | 20 |
| 72 | 35 | 27 |
| 144 | 48 | 43 |
| 192 | 57 | 51 |
| 240 | 57 | 62 |

Example 3

Comparative fermentations were carried out to determine the effect of sucrose concentration upon dextran production. The medium used in run A was made up as follows:

| | |
|---|---|
| Sucrose | 100 gm./1000 ml. |
| Yeast protein digest | 5 gm./1000 ml. |
| $K_2HPO_4$ | 20 gm./1000 ml. |
| Initial pH | 7.6 |

The medium used in run B was the same as in run A except that the sucrose level was increased to 200 gm./1000 ml. The fermentation conditions were the same as in the still group of Example 2. Dextran determinations were made at the time intervals indicated in Table IV.

TABLE IV

| Time, Hrs. | Dextran Yield, percent of theory | |
|---|---|---|
| | Run A | Run B |
| 24 | 31 | 5.9 |
| 48 | 55 | 18 |
| 72 | 59 | 30 |
| 120 | 46 | 48 |

Analysis of the dextran fractionated from the 72 hour product of run A by a single precipitation between the limits of 45 and 52 percent methanol showed the following properties.

| | |
|---|---|
| Light scattering mol. wt. | 86,200 |
| Reducing power mol. wt. | 278,000 |
| Nitrogen | .029 |
| $[\alpha]_D^{20}$ | +211.4 |
| Yield, basis total dextran present ____percent__ | 78 |

The reducing power molecular weight being higher than the light scattering molecular weight indicates the absence of reducing and groups customarily found for dextran prepared by hydrolysis and fractionation.

Dextran was fractionated from the 120-hour product of run B by high speed centrifugation to separate a small amount of very high molecular weight dextran followed by precipitation at 50 percent methanol. The light scattering molecular weight was determined to be 60,600, and the yield based on the total dextran present was 40.7 percent.

We claim:

1. The method of producing dextran of intermediate molecular weight which comprises cultivating Streptococcus sp. NRRL B-1351 in an aqueous medium comprising sucrose as a chief source of assimilable carbon, and a source of assimilable nitrogen, continuing the fermentation until a substantial proportion of the sucrose has been converted to dextran by the organism, and recovering dextran from the culture medium.

2. The method of producing dextran of intermediate molecular weight which comprises culturing Streptococcus sp. NRRL B-1351 in an aqueous medium comprising approximately 10 to 20 percent sucrose and a source of assimilable nitrogen at an initial pH within the range of 6 to 8 for from two days to about two weeks and recovering dextran from the culture medium.

References Cited in the file of this patent

UNITED STATES PATENTS

| 2,673,828 | Koepsell et al. | Mar. 30, 1954 |

OTHER REFERENCES

American Chem. Soc., Abstract of Papers, vol. 122, page 18A (1952).